(12) United States Patent
Kapinos et al.

(10) Patent No.: US 9,881,223 B2
(45) Date of Patent: Jan. 30, 2018

(54) FORMING SCANNED COMPOSITE DOCUMENT WITH OPTICAL CHARACTER RECOGNITION FUNCTION

(71) Applicant: Lenovo (Singapore) Pte. Ltd., Singapore (SG)

(72) Inventors: Robert James Kapinos, Durham, NC (US); Xin Feng, Morrisville, NC (US); Paul Hilburger, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 141 days.

(21) Appl. No.: 14/258,276

(22) Filed: Apr. 22, 2014

(65) Prior Publication Data
US 2015/0302246 A1 Oct. 22, 2015

(51) Int. Cl.
*G06K 9/32* (2006.01)
*G06K 9/00* (2006.01)

(52) U.S. Cl.
CPC ....... *G06K 9/3258* (2013.01); *G06K 9/00671* (2013.01); *G06K 2009/00489* (2013.01)

(58) Field of Classification Search
CPC ................................................. G06K 2209/01
USPC ........................................................ 348/207.1
See application file for complete search history.

(56) References Cited

U.S. PATENT DOCUMENTS

| | | | | |
|---|---|---|---|---|
| 6,057,832 A | * | 5/2000 | Lev | H04N 21/8455 348/E5.008 |
| 6,493,469 B1 | * | 12/2002 | Taylor | H04N 1/1903 348/E7.079 |
| 6,512,539 B1 | * | 1/2003 | Dance | H04N 1/195 348/146 |
| 7,123,292 B1 | * | 10/2006 | Seeger | G03B 5/02 348/218.1 |
| 7,627,142 B2 | * | 12/2009 | Kurzweil | G06F 3/017 348/62 |
| 7,821,679 B2 | * | 10/2010 | Hatzav | G03B 15/00 348/262 |
| 9,137,417 B2 | * | 9/2015 | Macciola | G06K 9/3208 |
| 2006/0017810 A1 | * | 1/2006 | Kurzweil | G06K 9/325 348/207.1 |
| 2015/0138399 A1 | * | 5/2015 | Ma | G06K 9/00624 348/239 |

* cited by examiner

*Primary Examiner* — Leron Beck
(74) *Attorney, Agent, or Firm* — Ference & Associates LLC

(57) ABSTRACT

An embodiment provides a method, including: capturing, using an image capture device of an electronic device, image data of a document; processing, using a processor, the image data; the processing including identifying text within the image data to form two or more images into a composite document of the document; and storing, in a memory, data related to the composite document. Other aspects are described and claimed.

18 Claims, 4 Drawing Sheets

FORMING SCANNED COMPOSITE DOCUMENT WITH OPTICAL CHARACTER RECOGNITION FUNCTION

BACKGROUND

Physical documents, e.g., paper documents, often need scanning to place them in electronic/digital form. There are different ways in which physical documents may be scanned.

For example, whole document scanners, cameras, line scanners, and the like are used to scan documents. The scanning captures the document as an image that may be stored, transmitted and manipulated. Often users scan documents as a way to consolidate physical papers and preserve the same in a more convenient format.

BRIEF SUMMARY

In summary, one aspect provides a method, comprising: capturing, using an image capture device of an electronic device, image data of a document; processing, using a processor, the image data; the processing including identifying text within the image data to form two or more images into a composite document of the document; and storing, in a memory, data related to the composite document.

Another aspect provides apparatus, comprising: an image capture device; a processor operatively coupled to the image capture device; a memory storing instructions executable by the processor to: capture, using the image capture device, image data of a document; process the image data; including identifying text within the image data to form two or more images into a composite document of the document; and store, in a memory, data related to the composite document.

A further aspect provides a computer program product, comprising: a storage device code stored therewith and executable by a processor, the code comprising: code that captures, using an image capture device of an electronic device, image data of a document; code that processes, using a processor, the image data, including identifying text within the image data to form two or more images into a composite document of the document; and code that stores, in a memory, data related to the composite document.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
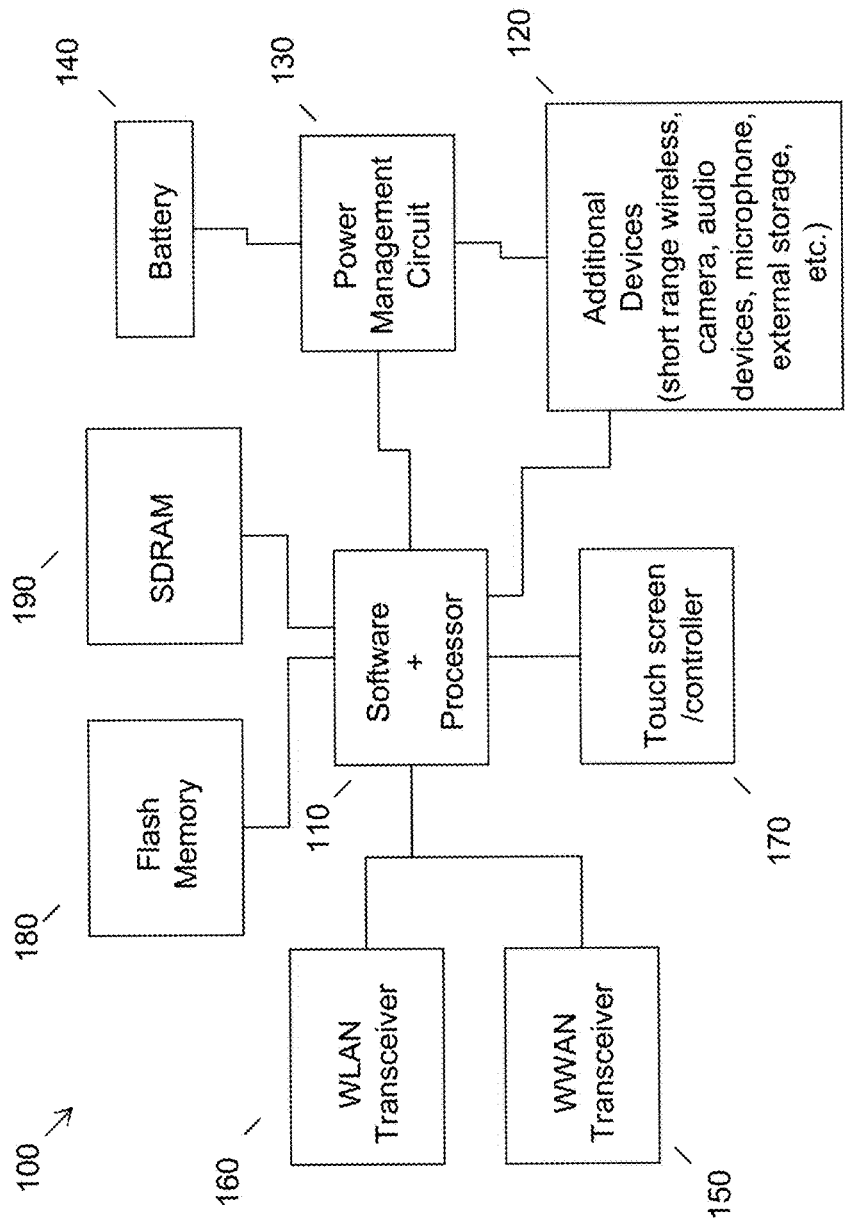
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using conventional mechanisms to scan physical documents, e.g., paper documents, is often problematic. For example, whole document scanners are bulky, slow, and require a lot of power. Document cameras are large and expensive. Line scanners are inefficient and often have non-user friendly interfaces. Using such devices, tiny text foils all but the best cameras. Moreover, the files produced are bulky and undifferentiated.

Accordingly, an example embodiment provides a method of using a device with a standard camera, e.g., low-resolution (720p), to capture multiple pictures of the document as it is passed under the lens. The document can be passed in any direction, and in two axes. A user may even hold the document, or it can be supported on some surface. If the document is fixed, the camera is moved around until all parts of the document are captured by the images.

Once captured, firmware or software, e.g., inside the camera or the device, performs page boundary finding, optical character recognition (OCR), and picture/graphic detection on the captured images. The firmware or software also transforms, de-skews, scales, and stitches the images together, e.g., along the lines of the (optically recognized) text to produce a single composite document that is a near-facsimile of the original. This composite document has text incorporated as text with appropriate fonts assigned, and contains images, which may be incorporated in editable form. The document may then be saved as a low-bulk copy. Differentiated content can be shared directly to programs that can accept it, e.g., text to a text editor or pictures to PHOTOSHOP photo editing software. PHOTOSHOP is a registered trademark of Adobe Systems Incorporated in the United States and other countries.

The illustrated example embodiments will be best understood by reference to the figures. The following description is intended only by way of example, and simply illustrates certain example embodiments.

While various other circuits, circuitry or components may be utilized in information handling devices (also referred to herein as apparatuses, electronic devices, or simply devices), with regard to smart phone and/or tablet circuitry 100, an example illustrated in FIG. 1 includes a system on a circuit design found for example in tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image capture device such as a camera. System 100 often includes a touch screen 170 for data input and display/rendering. System 100 also typically includes various memory devices, for example flash memory 180 and SDRAM 190.

Figure 2:
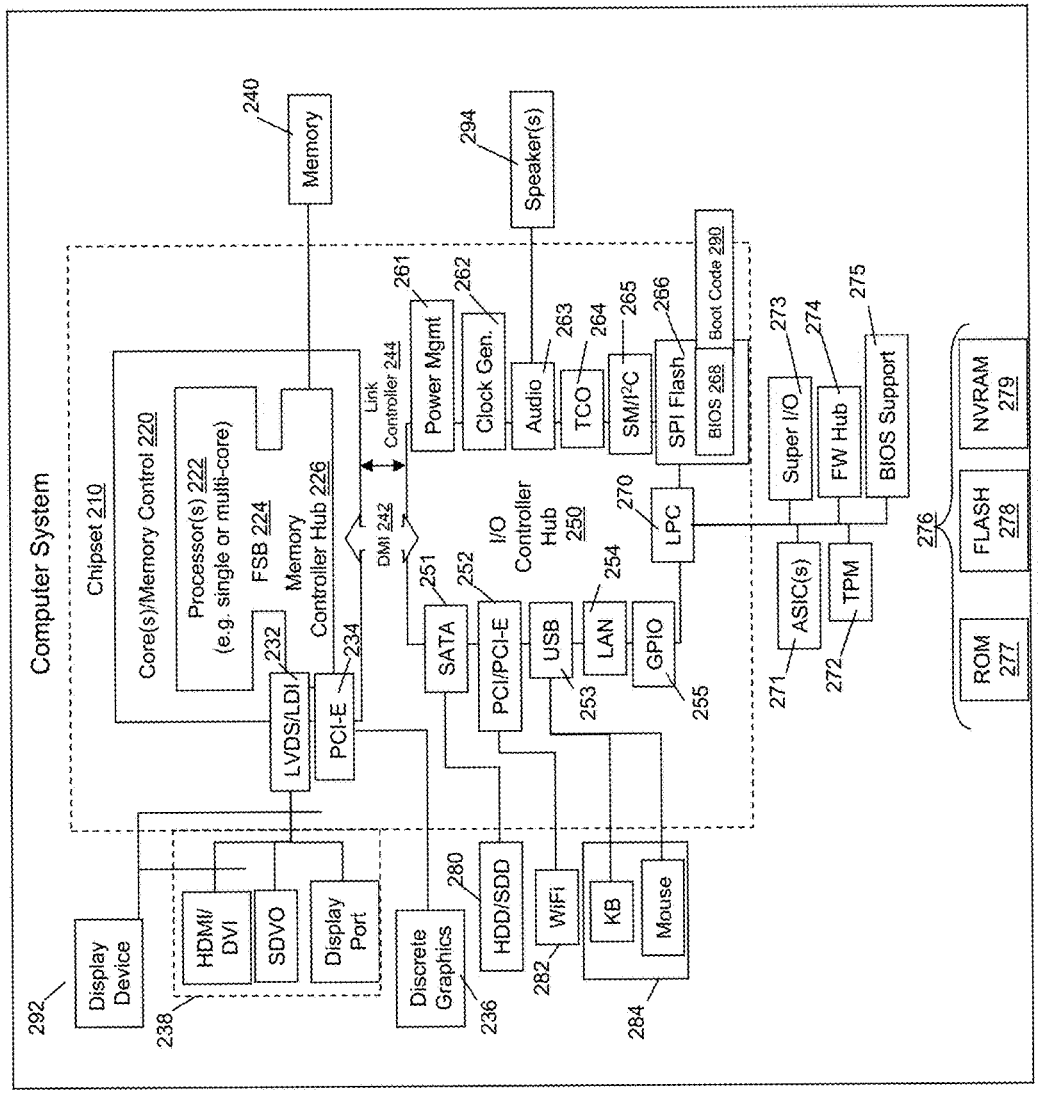
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
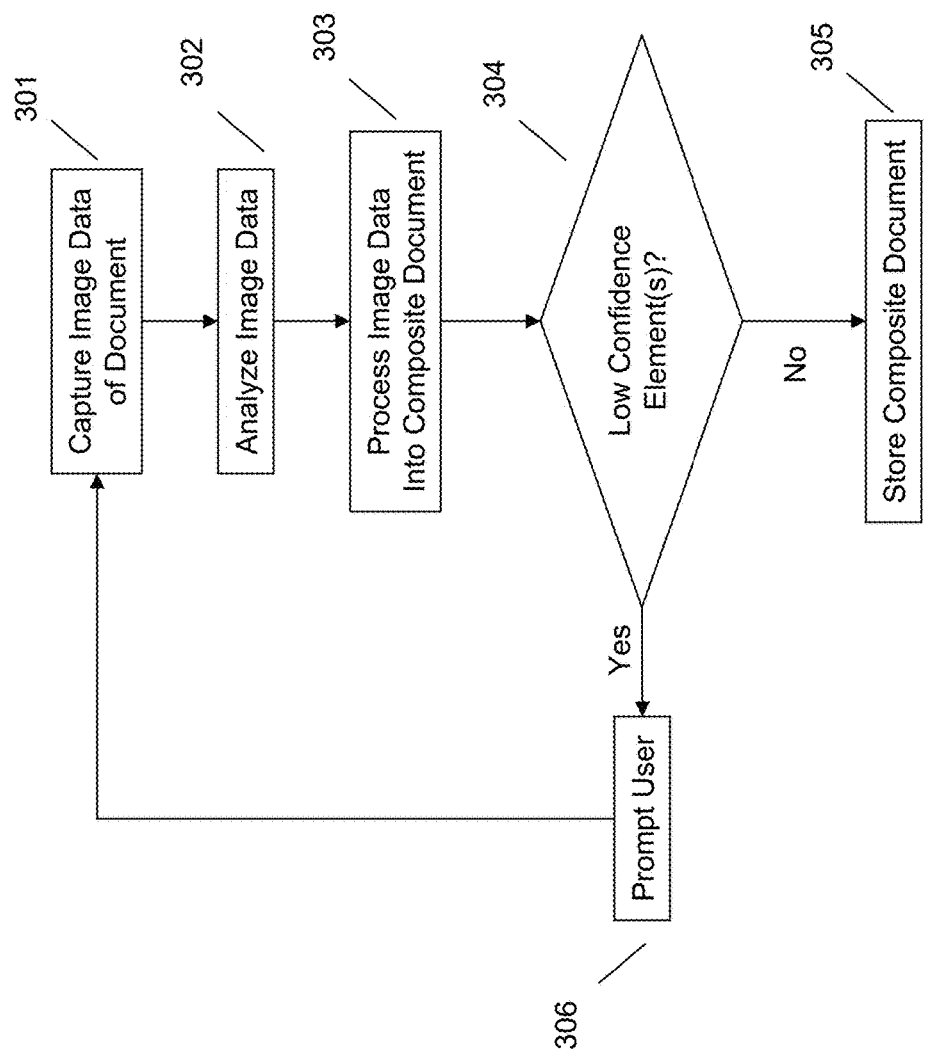
FIG. 3 illustrates an example method of forming scanned composite document.

Circuitry, as for example outlined in FIG. 1 or FIG. 2, may be used to form a scanned composite document. By way of example, referring to FIG. 3 and FIG. 4(A-B), in an embodiment, at 301, a user may capture, using an image capture device of an electronic device, e.g., such as a camera included on a smart phone (refer to FIG. 4A-4B, 402A-B), image data of a document (401A-401B). At 302, an embodiment then analyzes, e.g., using a processor of a device such as a smart phone (402A-B) or component thereof, e.g., firmware included in a camera, the image data captured.

The analyzing at 302 may include processing the image data to form a composite document at 303. For example, an embodiment may process text image data of the document to form two or more images into a composite document. The two or more images used to form the composite document are derived from a document scanning process.

Figure 4B:
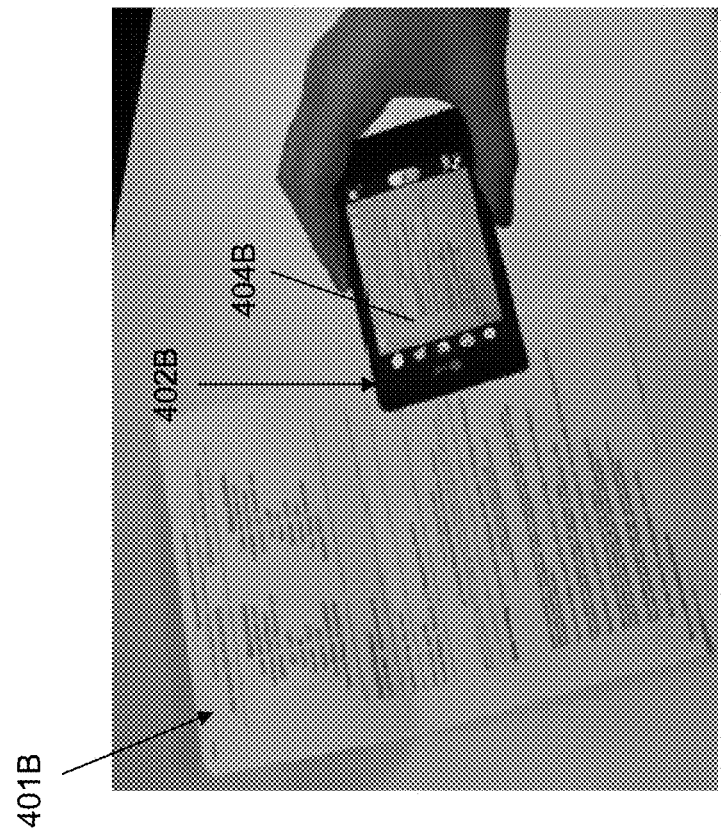
FIG. 4(A-B) illustrates an example of scanning a document using a handheld mobile device to form a composite document.
Figure 4A:
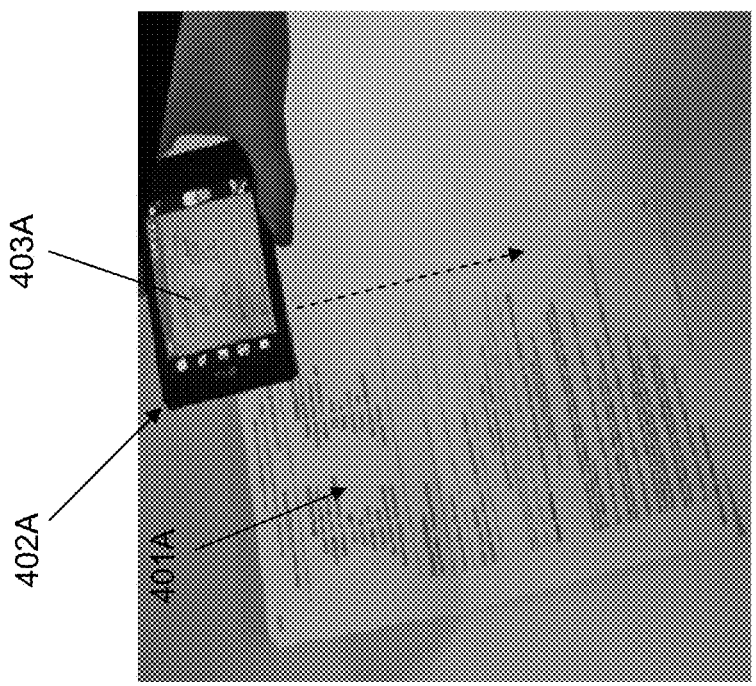

An example of document scanning using a smart phone is illustrated in FIG. 4A-B. By way of example, referring to FIG. 4A, a user uses his or her smart phone 402A to scan a document 401A lengthwise, where the user scans the document with a top to bottom motion, as illustrated by the dashed arrow in FIG. 4A. This permits the camera of the smart phone 402A to sequentially or continuously capture image data relating to the document 401A. The image data may be captured in variety of ways. In one example, a user may utilize the smart phone's 402A camera to capture images separately, e.g., sequentially. Similarly, a user may utilize the smart phone's 402A camera to capture image data, e.g., continuous video feed data that is then formed into two or more images (e.g., processed into frames).

Thus, a user initially captures image data relating to one part or portion of the document 401A, in this example image data 403A, corresponding to image data representing the top portion of the document 401A. As a user moves the smart phone 402A along the length of the document 401A, e.g., to the bottom of the document 401B, as illustrated in FIG. 4B, the user's device 402B captures additional image data 404B relating to a different portion of the document 401B, i.e., image data 404B relating to the bottom portion of the document 401B is captured.

Referring back to FIG. 3, the analyzing of 302 may include processing the image data to extract text data from the image data. For example, an embodiment may perform optical character recognition (OCR) to extract text from the image data. An embodiment may also analyze at 302 the image data to perform various action(s). An embodiment could use text physical parameters (its alignment, the font, the character size, etc.) to identify image rotation, areas of image overlap, and missing image elements. Also an embodiment may use physical text characteristics to determine how to transform the image data in manners usual for image stitching, e.g., de-keystoning the image, scaling the image elements, aligning the image data, adjusting contrast of the image data, etc. In contrast to usual image compositing techniques, embodiments for text compositing would not fill missing areas with algorithmically generated similarities.

The analyzing at 302 may further include linguistically analyzing the text data. For example, an embodiment may linguistically analyze the text data by accessing a database of linguistic rules, e.g., a database stored locally and/or stored in a remote storage location, such as for example, a cloud computing device or other network connected storage. An embodiment may use linguistic analysis or analytics to assist in forming the composite document. For example, the linguistic rules may be used by an embodiment to determine if text data of the image data may assist in matching two or more image portions for stitching the image portions together, e.g., adjacently located image portions may be more accurately aligned and formed together using linguistic analysis. In another example, the linguistic rules may be used to determine that text data is an overlapped portion that is redundant when stitching the image portions together. An embodiment may use linguistic analysis to determine if a portion of the image is a low confidence portion, e.g., a blurred image portion, a missing text portion, a linguistically erroneous image portion, of low resolution image portion, an image portion having poor image contrast, light level, etc.

An embodiment may determine that a portion of the image is of low confidence at 304 using, for example, one or more confidence thresholds. For example, an embodiment may determine that a portion of the image data initially is of low confidence, i.e., the image data portion as a whole is of low quality such as having a low light characteristic, being incomplete (i.e., literally missing a part of the document), low contrast, blurred, etc. An embodiment may use comparison of an image characteristic, e.g., contrast or light level, with an expected value.

Moreover, as part of the processing of the image data into a composite document at 303, an embodiment may determine that the composite document is difficult or impossible to form using one or more low quality elements, e.g., blurred document portions. Thus, an embodiment may identify one or more low confidence elements, e.g., at 304, and prompt a user at 306. Otherwise, i.e., if low confidence element(s) are not present, an embodiment may store the composite document at 305.

The prompting at 306 may take a variety of forms. For example, an embodiment may simply highlight an area or areas of the composite document that contain low confidence element(s). Thus, a user may be apprised of a lower quality or incomplete composite document at 306, in which case the user may be given the opportunity to re-capture additional image data that may be then utilized to correct (e.g., re-form) the composite image. Likewise, an embodiment may include in a prompt at 306 a graphical user interface that permits or queries the user to select one of a plurality of underlying image(s) to form the composite image. Thus, an embodiment may permit a user to select a best underlying image to form the composite document. Some embodiments may suggest text based alternatives based on linguistic or markov-chain heuristics if no underlying image is coherent enough for high confidence processing.

Accordingly, as illustrated by the example embodiments and the figures, an embodiment allows a user to scan, e.g., using a device with a standard camera, to capture multiple pictures (either sequentially or continuously) of a physical document as it is passed under the scanning lens. The document can be passed in any direction, and in two axes. As discussed, the image data used to form a composite document may be captured in a continuous motion, e.g., as outlined in FIG. 4(A-B) or via the user taking multiple pictures, even if out of sequence. A user may even hold the document, or it can be supported on some surface scanning. If the document is fixed, the camera may be moved around until all parts are captured by the images.

Once captured, an embodiment performs page boundary finding, optical character recognition (OCR), and picture/graphic detection on the captured images. The firmware or software also transforms, scales, de-skews, and stitches the images together, e.g., along the lines of the (optically recognized) text to produce a single composite document that is a near-facsimile of the original. This composite document has text incorporated as text with appropriate fonts assigned, and contains images, which may be incorporated in editable form.

Therefore, a user is able to conveniently scan a document using a plurality of images, have the images automatically formed into a composite image, and stored. The resulting composite image, while not an exact reproduction, faithfully tracks the document contents and trades off exact duplication for ease of scanning, e.g., using a panoramic motion. Thus, with a simple scanning motion, a physical document may be electronically scanned in multiple parts, again either sequentially or continuously, and then stitched together, e.g., leveraging linguistic analytics of the text, such as derived from an OCR processing.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   capturing, using an image capture device of an electronic device, a plurality of images of a single physical document, each of the plurality of images including a different part of the single physical document;
   processing, using a processor, the plurality of images;
   the processing including identifying text within the plurality of images to combine two or more images into an electronic facsimile form of the document comprising the entire content of the single physical document, wherein the processing further comprises determining whether at least one low confidence element of at least one of the plurality of images is present, wherein the at least one low confidence element comprises an unreadable image portion and would result in an incomplete electronic facsimile form;
   responsive to determining that a low confidence element is present, notifying a user of the low confidence element, capturing at least one additional image comprising a portion of the single physical document corresponding to the low confidence element, and combining the plurality of images and the at least one additional image into an electronic facsimile form of the document; and
   storing, in a memory, the electronic facsimile form of the document.

2. The method of claim 1, wherein:
   said capturing comprises capturing continuous image data of the document; and
   said analyzing comprises forming two or more images from the continuous image data of the document.

3. The method of claim 2, wherein continuous image data comprises continuous video feed data.

4. The method of claim 1, wherein the analyzing comprises processing the plurality of images to extract text data and perform an action selected from the group consisting of: transforming the plurality of images, scaling the plurality of images, de-skewing the plurality of images, adjusting contrast of the plurality of images.

5. The method of claim 4, wherein the analyzing comprises linguistically analyzing the text data.

6. The method of claim 5, wherein linguistically analyzing the text data comprises:
   accessing a database of linguistic rules; and
   analyzing text data of the two or more images to form the electronic facsimile form of the document.

7. The method of claim 1, wherein the analyzing comprises identifying at least one low confidence element of the electronic facsimile form of the document.

8. The method of claim 7, wherein the at least one low confidence element is associated with a characteristic selected from the group of characteristics consisting of: a blurred image, a missing image portion; a linguistically erroneous image portion, a low resolution portion of the image, an image portion having poor image contrast, an image portion having poor light level.

9. The method of claim 7, wherein the analyzing comprises identifying at least one image to remedy at least one low confidence element of the electronic facsimile form of the document; and
   the method further comprising prompting the user to capture additional image data associated with the low confidence element.

10. An apparatus, comprising:
    an image capture device;
    a processor operatively coupled to the image capture device;
    a memory storing instructions executable by the processor to:
    capture, using the image capture device, a plurality of images of a single physical document, each of the plurality of images including a different part of the single physical document;
    process the plurality of images to identify text within the plurality of images to combine two or more images into an electronic facsimile form of the document comprising the entire content of the single physical document, wherein the processing further comprises determining whether at least one low confidence element of at least one of the plurality of images is present, wherein the at least one low confidence element comprises an unreadable image portion and would result in an incomplete electronic facsimile form;

responsive to determining that a low confidence element is present, notify a user of the low confidence element, capture at least one additional image comprising a portion of the single physical document corresponding to the low confidence element, and combine the plurality of images and the at least one additional image into an electronic facsimile form of the document; and store, in a memory, the electronic facsimile form of the document.

11. The apparatus of claim 10, wherein:

to capture comprises capturing continuous image data of the document; and to analyze comprises forming two or more images from the continuous image data of the document.

12. The apparatus of claim 11, wherein continuous image data comprises continuous video feed data.

13. The apparatus of claim 10, wherein to analyze comprises processing the plurality of images to extract text data from the plurality of images and perform an action selected from the group consisting of: transforming the plurality of images, scaling the plurality of images, de-skewing the plurality of images, adjusting contrast of the plurality of images.

14. The apparatus of claim 13, wherein to analyze comprises linguistically analyzing the text data.

15. The apparatus of claim 14, wherein linguistically analyzing the text data comprises:

accessing a database of linguistic rules; and analyzing text data of the two or more images to form the electronic facsimile form of the document.

16. The apparatus of claim 10, wherein to analyze comprises identifying at least one low confidence element of the document in the electronic facsimile form of the document.

17. The apparatus of claim 16, wherein to analyze comprises identifying at least one image to remedy at least one low confidence element of the document in the electronic facsimile form of the document; and the instructions further executable by the processor to prompt the user to capture additional image data associated with the low confidence element.

18. A computer program product, comprising:

a storage device having code stored therewith that is executable by a processor, the code comprising:

code that captures, using an image capture device of an electronic device, a plurality of images of a single physical document, each of the plurality of images including a different part of the single physical document;

code that processes, using a processor, the plurality of images to identify text within the plurality of images to combine two or more images into an electronic facsimile form of the document comprising the entire content of the single physical document, wherein the processing further comprises determining whether at least one low confidence element of at least one of the plurality of images is present, wherein the at least one low confidence element comprises an unreadable image portion and would result in an incomplete electronic facsimile form;

responsive to determining that a low confidence element is present, code that notifies a user of the low confidence element, captures at least one additional image comprising a portion of the single physical document corresponding to the low confidence element, and combines the plurality of images and the at least one additional image into an electronic facsimile form of the document; and code that stores, in a memory, the electronic facsimile form of the document.

\* \* \* \* \*